United States Patent [19]

Fujita

[11] Patent Number: 5,399,954
[45] Date of Patent: Mar. 21, 1995

[54] INVERTER FOR USE WITH WINDING SYSTEM AND METHOD FOR CONTROLLING THE SAME

[76] Inventor: Minoru Fujita, c/o Fuji Electric Co., Ltd. 1-1, Tanabeshinden, Kawasaki-ku, Kawasaki-shi, Kanagawa, Japan

[21] Appl. No.: 103,047

[22] Filed: Jul. 28, 1993

[30] Foreign Application Priority Data

Aug. 5, 1992 [JP] Japan ................................ 4-208291

[51] Int. Cl.⁶ .............................................. H02P 5/34
[52] U.S. Cl. ................... 318/801; 318/807; 242/250
[58] Field of Search ............... 318/801, 807; 242/75, 242/75.5, 250

[56] References Cited

U.S. PATENT DOCUMENTS

| | | | |
|---|---|---|---|
| 3,670,235 | 6/1972 | Bejach | 318/801 |
| 3,938,757 | 2/1976 | Sargunar | . |
| 4,009,427 | 2/1977 | Takahashi | 318/801 |
| 4,157,488 | 6/1979 | Allan | . |
| 4,427,933 | 1/1984 | Wagener et al. | 318/807 |
| 4,731,572 | 3/1988 | Bolie | 318/807 |

FOREIGN PATENT DOCUMENTS 63-95890  4/1988  Japan .

*Primary Examiner*—William M. Shoop, Jr.
*Assistant Examiner*—Karen Masih

[57] ABSTRACT

An inverter for controlling the speed of a motor driving a reel on which a coil of a work is built up so that the peripheral speed of the coil becomes equal to the feed speed of the work. The inverter includes a PWM control portion, an output frequency mean value calculation portion, a memory portion, a primary winding speed setting portion, and a summing and PI control portion. The output frequency mean value calculation portion sequentially computes mean values of the output frequency of the inverter during individual intervals of a series of predetermined intervals during the winding operation. The memory portion stores the mean value of a preceding interval. The primary winding speed setting portion sequentially set the command value of the output frequency of the inverter on the basis of the stored mean value. For example, the command value is set at the mean value of the preceding interval, or p times the mean value (p<1). The summing and PI control portion adds or subtracts a speed correction amount, which is obtained from the displacement of a dancer roll or the like, to or from the command value, and performs PI control on that result in order to determine the output frequency of the inverter during the present interval. This makes it possible to reduce both the speed correction amount and the oscillation amount of the dancer roll, and to realize a stable and accurate winding operation.

8 Claims, 4 Drawing Sheets

INVERTER FOR USE WITH WINDING SYSTEM AND METHOD FOR CONTROLLING THE SAME

BACKGROUND OF THE INVENTION

1. Field of the Invention

The present invention relates to an inverter for use with a winding system and a method for controlling the inverter which controls the speed of a motor driving a reel of the winding system that winds a work in the form of an elongated material on the reel at a certain speed to form a coil.

2. Description of Related Art

FIG. 1 shows a typical conventional winding system. In this figure, the reference numeral 1 designates a winding shaft of a reel on which a work 3, e.g., an elongated material such as wire is wound to form a coil 2. The reference numeral 4 designates an AC motor for driving the reel, 5 denotes a dancer roll, 6 designates a detector for detecting the displacement of the dancer roll 5, and 7 denotes a feeder of the work 3.

The speed of the motor 4 is controlled by an inverter 20 comprising an initial primary speed setting portion 11, a summing and PI control portion 13, and a PWM control portion 14. The initial primary speed setting portion 11 determines the initial peripheral speed $V_0$ of the coil 2 (that is, the initial winding speed of the reel) at the start of the winding operation. The summing and PI control portion 13 adds or subtracts a speed correction amount $\Delta D$ to and from the initial primary speed $V_0$ in accordance with the polarity of the correction amount $\Delta D$, and performs the PI operation on that result to determine the output frequency $f_i$ of the inverter 20. Here, the correction amount $\Delta D$ is obtained by converting the output of the detector 6 that detects the displacement of the dancer roll 5. This displacement corresponds to the looseness or tension of the work 3. The correction amount $\Delta D$ is zero at the start of the winding operation because the initial winding speed equals the initial primary speed $V_0$.

In the winding system as shown in FIG. 1, the peripheral speed of the coil 2 will increase with the build-up of the radius of the coil 2 as the winding operation proceeds if the rotational speed of the reel is maintained constant. On the other hand, the peripheral speed of the coil 2 (that is, the winding speed) must be equal to the line speed (that is, the work feed speed) because the feeding rate of the work 3 is constant. This requires the correction of the speed of the motor 4 in response to the build-up of the radius of the coil 2.

To achieve this correction, the conventional winding system detects the displacement of the dancer roll 5 or the fluctuation of the tension of the work 3, and produces the correction amount on the basis of the detected value. More specifically, the speed of the motor 4 for driving the reel is controlled as follows: First, the initial output frequency of the inverter 20 at the start of the winding operation is set at a value corresponding to the rotational speed of the motor that provides the initial winding speed of the reel. Second, the output frequency of the inverter 20 is corrected in accordance with the difference between the line speed at which the work 3 is transferred and the reel winding speed, that is, the peripheral speed of the coil 2, thereby maintaining the peripheral speed, which might increase consistently with the diameter build-up of the coil 2, equal to the line speed. The correcting control is carried out by detecting the displacement of the dancer roll 5 placed in the way of the winding path for absorbing looseness of the work 3, or by detecting the fluctuation of the tension of the work 3. For example, when the dancer roll 5 moves downward owing to an increase in the looseness of the work 3, the output frequency of the inverter 20 is increased so that the speed of the motor 4 is increased.

FIGS. 2A and 2B are graphs illustrating the change in the correction amount $\Delta f$ of the output frequency of the inverter 20. In these figures, the point P indicates the starting point of the winding operation, and the output frequency $f_i$ of the inverter 20 is represented as a function of the radius R of the coil 2. The difference $\Delta f_k$ ($k=1, 2, \ldots$) is the frequency equivalent of the correction amount $\Delta D$ associated with the displacement of the dancer roll 5.

FIG. 2A shows the behavior of the output frequency $f_i$ while the radius R of the coil 2 varies from the initial radius $R_{ii}$ to the final radius $R_{if}$ during the winding process. According to such change in the radius R of the coil 2, the output frequency $f_i$ of the inverter undergoes the frequency reduction correction which is performed by subtracting the correction amounts $\Delta f_1$, $\Delta f_2$, $\Delta f_3$, etc. from the initial value fii corresponding to the initial peripheral speed $V_0$ of the coil 2, and reaches the final value $f_{if}$. Here, the characteristic curve L denoted by the dashed-and-dotted line represents a virtual curve that would be obtained when the output frequency $f_i$ of the inverter 20 is reduced in inverse proportion to the radius R of the coil 2. In practice, however, the amount of correction in accordance with the displacement of the dancer roll 5 will oscillate in a narrow region across the settling values determined by the inertia of the winding control system. The characteristic curve L corresponds to the average of the fluctuation.

FIG. 2B is an enlarged graph showing the portion A of FIG. 2A to illustrate the oscillation behavior of the frequency reduction correction amount $\Delta f_k$. As shown, the output frequency $f_i$ of the inverter 20 oscillates across the characteristic curve L.

Thus, in the conventional winding system, the correction amount for reducing the output frequency of the inverter 20 increases as the winding operation proceeds. As a result, if the gain for the correction amount with regard to the initial primary speed is increased in order to increase the response speed of the winding control, both the displacement of the dancer roll 5 and the correction amount associated with the displacement will increase at the same time. This will increase the fluctuation amount of the dancer roll 5 in the vertical direction and degrade its settling characteristic in a case where some disturbance occurs or the winding operation is restarted after an interruption.

In other words, the conventional winding system cannot achieve a reliable, accurate winding operation. This may deteriorate the quality of the coil 2, a product which is formed by winding the work 3. Furthermore, a large space must be provided for allowing the vertical movement of the dancer roll 5.

SUMMARY OF THE INVENTION

It is therefore an object of the present invention to provide an inverter for controlling coiling which can realize a reliable, high accuracy coiling, and reduce the space required for allowing the oscillation of the dancer roll.

In a first aspect of the present invention, there is provided an inverter for use with a winding system including an AC motor which is driven by the inverter and drives a reel for winding a work fed at a predetermined feed rate to form a coil, and a detector for detecting the tension of the work, the inverter comprising:

means for obtaining a mean value of the output frequency of the inverter during each interval of a series of predetermined intervals during the winding;

means for storing the mean value of the output frequency of the inverter obtained with the series of intervals;

means for setting a command value of the output frequency of the inverter during a present interval in the series of intervals on the basis of the mean value which has been obtained during a preceding interval; and means for correcting the command value in the present interval in accordance with the tension of the work, so that the peripheral speed of the coil becomes equal to the feed rate of the work.

Here, the command value of the output frequency of the inverter may be the mean value obtained during the preceding interval.

The command value of the output frequency of the inverter may be the mean value obtained during the preceding interval multiplied by a fixed value less than one.

The command value of the output frequency of the inverter when a winding operation is restarted after an interruption may be determined as the mean value obtained during a predetermined interval before the interruption.

The predetermined interval may be the last interval before the interruption.

The inverter may further comprise a reset switch for replacing the mean value which has been stored during a preceding winding operation with a predetermined reference value of the output frequency of the inverter.

The detector may detect the correlate of the tension of the work in terms of displacement of a dancer roll provided in the course of the work.

In a second aspect of the present invention, there is provided a winding system including an inverter which drives an AC motor driving a reel for winding a work fed at a predetermined feed rate to form a coil, and a detector for detecting a tension of the work, the inverter comprising:

means for obtaining a mean value of the output frequency of the inverter during each interval of a series of predetermined intervals during winding;

means for storing the mean value of the output frequency of the inverter obtained with the series of intervals;

means for setting a command value of the output frequency of the inverter during a present interval in the series of intervals on the basis of the mean value which has been obtained during a preceding interval; and means for correcting the command value of the present interval by the correlate of tension of the work, so that the peripheral speed of the coil becomes equal to the feed rate of the work.

In a third aspect of the present invention, there is provided a method for controlling an inverter for use with a winding system including an AC motor which is driven by the inverter and drives a reel for winding a work fed at a predetermined feed rate to form a coil, and a detector for detecting the tension of the work, the method comprising the steps of:

obtaining a mean value of output the frequency of the inverter during each interval of a series of predetermined intervals during the winding;

storing the mean value of the output frequency of the inverter obtained with the series of intervals;

setting a command value of the output frequency of the inverter during a present interval in the series of intervals on the basis of the mean value which has been obtained during a preceding interval; and correcting the command value in the present interval in accordance with the tension of the work, so that the peripheral speed of the coil becomes equal to the feed rate of the work.

According to the present invention, the command value of the output frequency of the inverter is reduced stepwise in accordance with the mean value of the preceding interval. As a result, the correction amount which is added to or subtracted from the command value can be reduced substantially. This makes it possible to realize a highly reliable, precise coiling.

The above and other objects, effects, features and advantages of the present invention will become more apparent from the following description of the embodiment thereof taken in conjunction with the accompanying drawings.

DETAILED DESCRIPTION OF PREFERRED EMBODIMENT

The invention will now be described with reference to the accompanying drawings.

Figure 1:
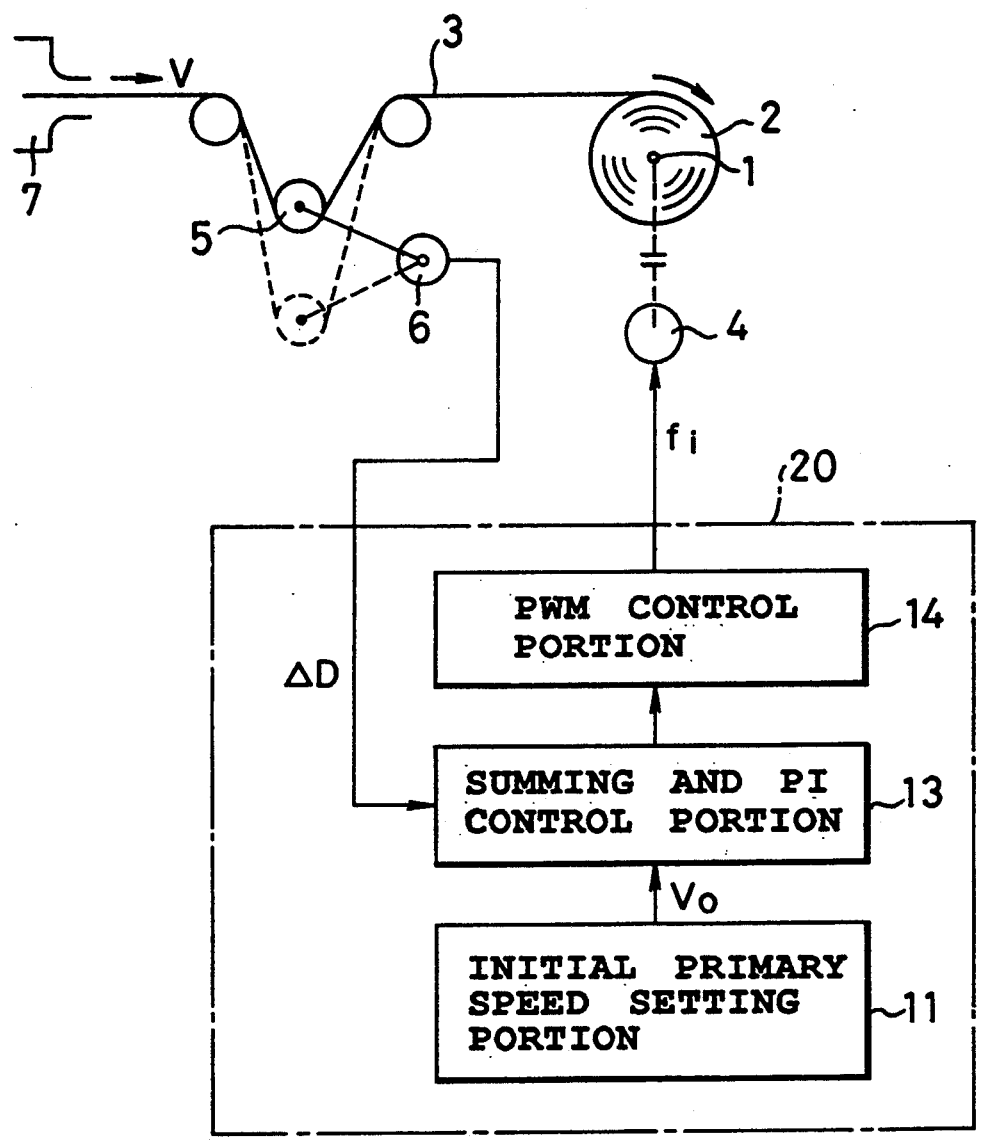
FIG. 1 is a block diagram showing a conventional winding system and an inverter incorporated in the system.
Figure 3:
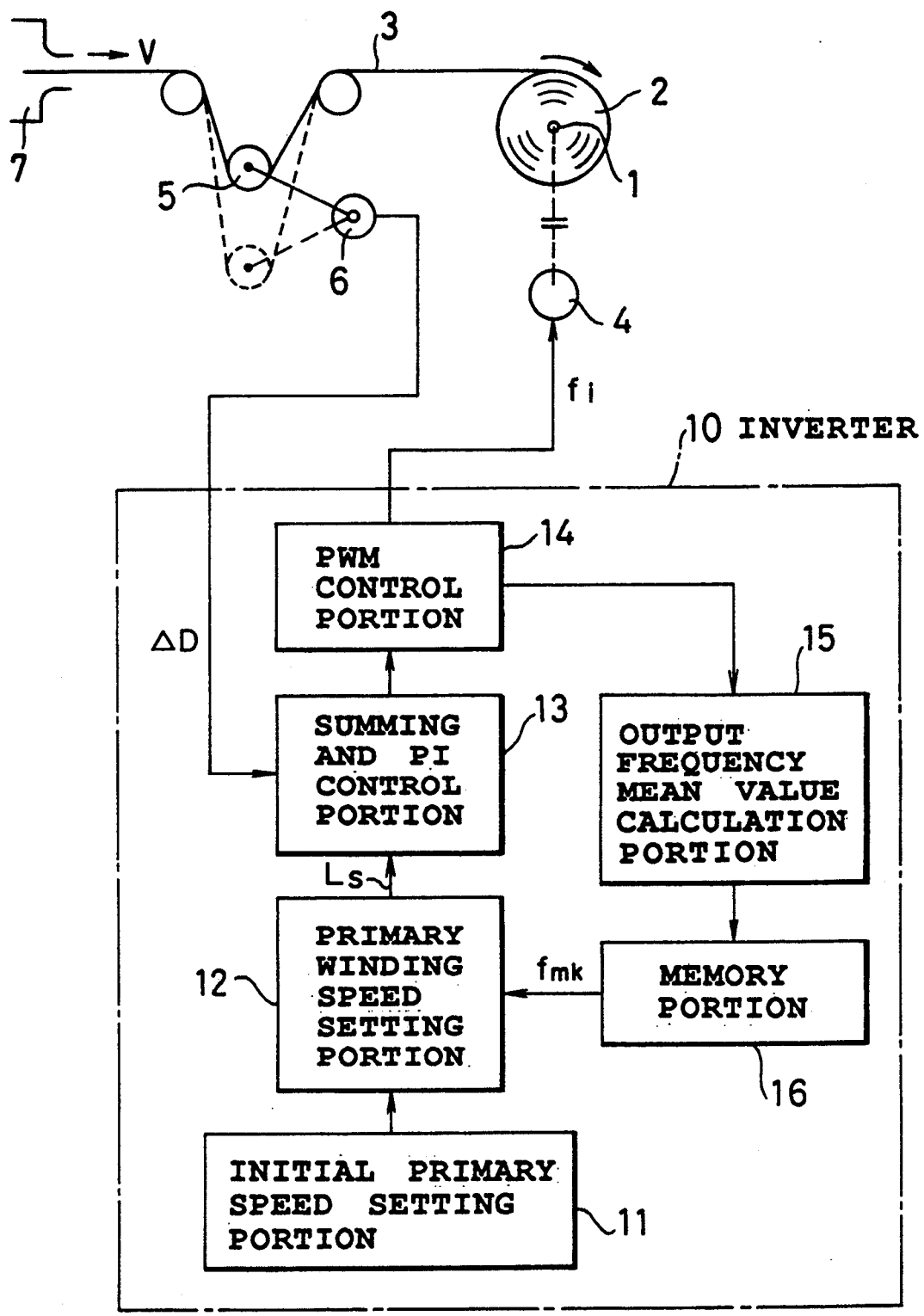
FIG. 3 is a block diagram showing an embodiment of a winding system and an inverter incorporated in the system in accordance with the present invention.
Figure 4:
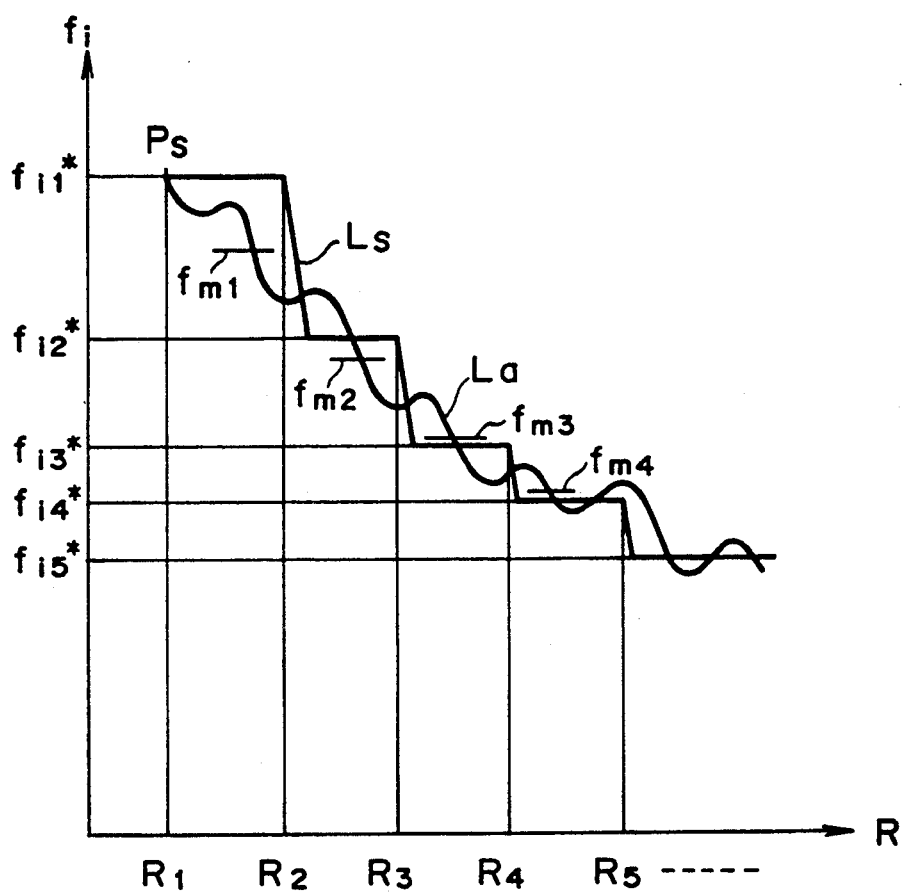
FIG. 4 is a graph illustrating the characteristics of the output frequency of the inverter of FIG. 3 in terms of coil radii.

FIG. 3 shows an embodiment of a winding system in accordance with the present invention, and FIG. 4 is a characteristic graph illustrating the coil radius R versus the output frequency of the inverter. In FIGS. 1 and 3, like portions are designated by the same reference numerals.

This embodiment differs from the system of FIG. 1 in the arrangement of an inverter 10. More specifically, the inverter 10 of the embodiment comprises an output frequency mean value calculation portion 15, a memory portion 16, and a primary winding speed setting portion 12 in addition to the components of the inverter 20 in FIG. 1. The output frequency mean value calculation portion 15 computes the mean value of the output frequency $f_i$ of the inverter commanded by the PWM control portion 14 during each interval of a series of predetermined intervals in the winding operation. The memory portion 16 stores the calculated results of the calculation portion 15. The primary winding speed setting portion 12 reads the content of the memory portion 16, replaces the initial primary speed $V_0$ which has been set by the initial primary setting portion 11 with that read value. This replacement of the set value with the value read from the memory portion 16 is sequentially performed for each interval thereafter.

FIG. 4 is a characteristic graph illustrating the relationship between the coil radius R and the output frequency $f_i$ of the inverter in this embodiment In this figure, the values $f_{i1}^*$, $f_{i2}^*$, $f_{i3}^*$, ... represent command values of the output frequency of the inverter 10, the values $f_{m1}$, $f_{m2}$, $f_{m3}$, ... represent the mean values calculated during individual intervals, the stepwise line $L_s$ represents the output of the primary winding speed setting portion 12, and the line $L_a$ represents the actual output frequency of the inverter 10.

A series of intervals is determined in advance, and mean values $f_{mk}$ of the output frequency $f_i$ of the inverter 10 are sequentially calculated during the individual intervals. Since the coil radius R is determined as a function of time, the intervals can be expressed in terms of the radii $R_1$, $R_2$, $R_3$,... as shown in FIG. 4. The individual distances $R_1$–$R_2$, $R_2$–$R_3$, $R_3$–$R_4$, ... between the radii $R_1$, $R_2$, $R_3$, $R_4$, ... correspond to the increase in the radius of the coil 2 during the intervals. Here, these intervals are not necessarily uniform.

The output frequency command values $f_{ik}^*$ (k=1, 2, 3, ... n) are determined for each of the intervals as follows: First, the output frequency mean value calculation portion 15 computes the mean value $f_{mk-1}$ during the previous interval k-1 on the basis of the output of the PWM control portion 14, and stores the result into the memory portion 16. Then, the primary winding speed setting portion 12 reads the mean value $f_{mk-1}$ from the memory portion 16, and multiplies it by a fixed value p (=0.8, for example) which is smaller than one.

In other words, the command value $f_{ik}^*$ of the present interval k can be expressed as follows:

$$f_{ik}^* = P \times f_{mk-1}$$

Alternatively, the command value $f_{ik}^*$ may be set at the mean value $f_{mk-1}$ of the previous interval.

The primary winding speed setting portion 12 slightly modifies the command value $f_{ik}^*$ so that a rather soft change between the proximate command values is obtained as indicated by the line $L_s$, and feeds the command value to the summing and PI control portion 13. The summing and PI control portion 13 adds the displacement $\Delta D$ to the command value and supplies it to the PWM control portion 14.

Figure 2A:
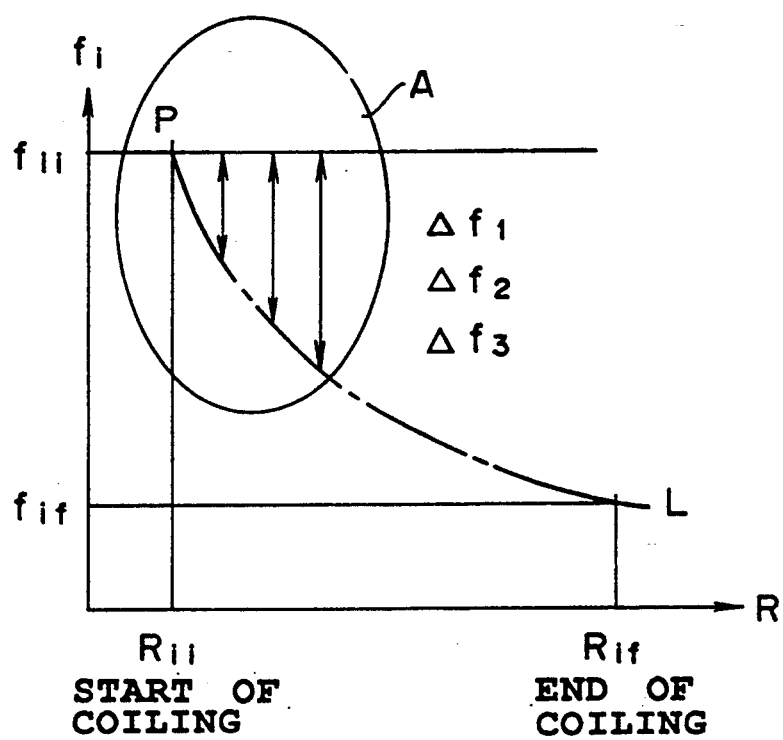
FIG. 2A is a graph illustrating the characteristics of the output frequency of the inverter of FIG. 1 in terms of coil radii.
Figure 2B:
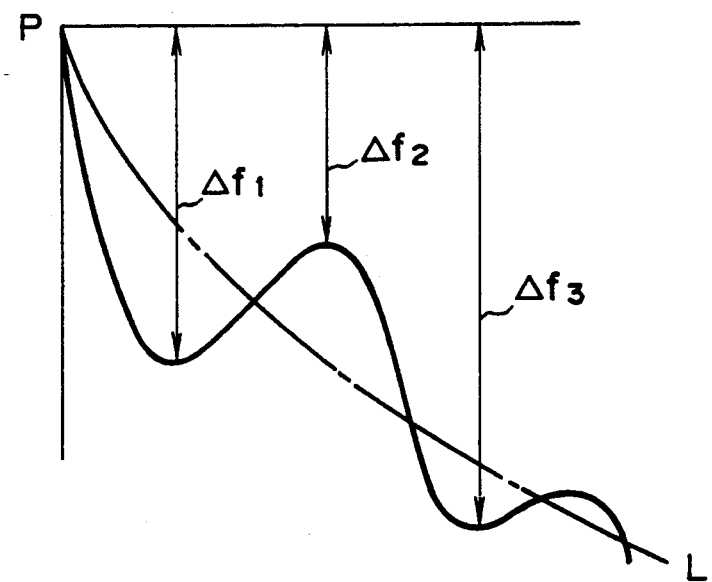
FIG. 2B is an enlarged graph illustrating the portion A of FIG. 2A.

Thus, the inverter 10 is controlled in accordance with the characteristic line $L_s$, and the actual output frequency of the inverter 10 changes as indicated by the characteristic line $L_a$. It is easily seen that the deviation of the line $L_a$ from the line $L_s$ is much smaller than the deviations $\Delta f_1$, $\Delta f_2$, $\Delta f_3$, etc. of FIG. 2A, which increase as the coiling proceeds. This makes it possible to improve both the response time and settling time of the winding control which is carried out by controlling the AC motor 4 through the inverter 10. Furthermore, a more reliable and precise winding than is obtained with the conventional system can be achieved. Moreover, the space required for allowing displacement of the dancer roll 5 can be reduced.

When the operation of the winding system is interrupted owing to a power failure or the like, the mean value of the output frequency $f_{mk}$ of the inverter 10 during the interval immediately before the power failure is stored in the memory portion 16, and the stored value is set as the command value of the output frequency of the inverter 10 at the restart of the winding system.

In addition, when the winding operation is newly started by setting a new reel after completing the preceding winding operation, or after an interruption, the mean value of the output frequency of the inverter 10, which has been stored during the previous winding operation is cleared from the memory portion 16 by pushing a reset switch, and the reference output frequency is set which corresponds to the initial step of the winding operation.

The present invention has been described in detail with respect to an embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An inverter for use with a winding system including an AC motor driven by the inverter, said motor driving a reel for winding a work in the form of an elongated material fed at a predetermined feed rate to form a coil, and a detector for detecting a tension of the work, said inverter comprising:

means for obtaining a mean value of an output frequency of said inverter during each interval of a series of predetermined intervals during the winding;

means for storing the mean values of the output frequency of said inverter obtained during the series of intervals;

means for setting a command value of the output frequency of said inverter during a present interval in the series of intervals on the basis of the mean value which has been obtained during a preceding interval; and means for correcting said command value in the present interval in accordance with the tension of the work, so that a peripheral speed of the coil becomes equal to the feed rate of the work.

2. The inverter as claimed in claim 1, wherein said command value of the output frequency of said inverter is the mean value obtained during the immediately preceding interval.

3. The inverter as claimed in claim 1, wherein said command value of the output frequency of said inverter is the mean value obtained during the preceding interval multiplied by a fixed value less than one.

4. The inverter as claimed in claim 1, wherein said command value of the output frequency of said inverter, when a winding operation is restarted after an interruption thereof, is the mean value obtained during a predetermined interval before the interruption.

5. The inverter as claimed in claim 4, wherein said predetermined interval is the last interval before the interruption.

6. The inverter as claimed in claim 4, further comprising a reset switch for replacing the mean value which has been stored during a preceding winding operation with a predetermined reference value of the output frequency of said inverter.

7. The inverter as claimed in claim 1, wherein the winding system further includes a dancer roll traversed by the work prior to winding on the reel, and wherein said detector detects the tension of the work by a displacement of said dancer roll.

8. A method for controlling an inverter for use with a winding system including an AC motor driven by the inverter, said motor driving a reel for winding a work in the form of an elongated material fed at a predetermined feed rate to form a coil, and a detector for detecting tension of the work, said method comprising the steps of:

obtaining a mean value of an output frequency of said inverter during each interval of a series of predetermined intervals during the winding;

storing the mean values of the output frequency of said inverter obtained during the series of intervals;

setting a command value of the output frequency of said inverter during a present interval in the series of intervals on the basis of the mean value which has been obtained during a preceding interval; and correcting said command value in the present interval in accordance with the tension of the work, so that a peripheral speed of the coil becomes equal to the feed rate of the work.

* * * * *

UNITED STATES PATENT AND TRADEMARK OFFICE
CERTIFICATE OF CORRECTION

PATENT NO. : 5,399,954
DATED : March 21, 1995
INVENTOR(S) : Minoru FUJITA

It is certified that error appears in the above-indentified patent and that said Letters Patent is hereby corrected as shown below:

On the Title Page:

Please insert the following:

Item [73]   Assignee: Fuji Electric Co., Ltd., Kawasaki-shi, Japan --

Signed and Sealed this

Twenty-seventh Day of August, 1996

Attest:

BRUCE LEHMAN

Attesting Officer

Commissioner of Patents and Trademarks